(12) United States Patent
Peng et al.

(10) Patent No.: US 9,064,514 B2
(45) Date of Patent: Jun. 23, 2015

(54) TRENCHED NEAR-FIELD TRANSDUCER FOR HEAT ASSISTED MAGNETIC RECORDING

(71) Applicant: Seagate Technology LLC, Cupertino, CA (US)

(72) Inventors: Chubing Peng, Eden Prairie, MN (US); Yongjun Zhao, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/931,049

(22) Filed: Jun. 28, 2013

(65) Prior Publication Data

US 2015/0003218 A1    Jan. 1, 2015

(51) Int. Cl.
*G11B 11/00* (2006.01)
*G11B 5/48* (2006.01)
*G11B 13/04* (2006.01)

(52) U.S. Cl.
CPC ............. *G11B 5/4866* (2013.01); *G11B 13/04* (2013.01)

(58) Field of Classification Search
None
See application file for complete search history.

(56) References Cited

U.S. PATENT DOCUMENTS

| 6,888,984 | B2 | 5/2005 | Abeles et al. |
| 7,027,700 | B2 | 4/2006 | Challener |
| 7,272,079 | B2 | 9/2007 | Challener |
| 7,336,988 | B2 | 2/2008 | Schnitzer |
| 7,652,954 | B2 | 1/2010 | Fontana et al. |
| 7,880,996 | B2 | 2/2011 | Stipe |
| 8,169,881 | B2 | 5/2012 | Balamane et al. |
| 8,264,918 | B2 | 9/2012 | Hashimoto et al. |
| 8,295,132 | B2 | 10/2012 | Jin et al. |
| 8,345,518 | B2 | 1/2013 | Khizroev et al. |
| 8,369,192 | B1 | 2/2013 | Komura et al. |
| 8,391,108 | B2 | 3/2013 | Peng et al. |
| 8,488,419 | B1* | 7/2013 | Jin et al. ............ 369/13.32 |
| 8,514,673 | B1* | 8/2013 | Zhao et al. ............ 369/13.33 |
| 8,654,618 | B1* | 2/2014 | Liu et al. ............ 369/13.33 |
| 8,804,468 | B2* | 8/2014 | Zhao et al. ............ 369/13.33 |
| 2006/0090178 | A1 | 4/2006 | Stipe |
| 2008/0049563 | A1 | 2/2008 | Konno et al. |
| 2008/0149809 | A1 | 6/2008 | Hamann et al. |
| 2008/0151360 | A1 | 6/2008 | Stipe |
| 2010/0123967 | A1* | 5/2010 | Batra et al. ............ 369/13.33 |
| 2010/0163521 | A1 | 7/2010 | Balamane et al. |
| 2010/0165499 | A1 | 7/2010 | Stipe |
| 2010/0165802 | A1 | 7/2010 | Stipe |
| 2010/0165822 | A1 | 7/2010 | Balamane et al. |
| 2011/0128829 | A1* | 6/2011 | Nishida et al. ............ 369/13.33 |
| 2011/0159446 | A1* | 6/2011 | Boutaghou ............ 369/13.33 |

(Continued)

OTHER PUBLICATIONS

File History for U.S. Appl. No. 13/550,280 as was retrieved from the U.S. Patent and Trademark Office on Apr. 25, 2014, 149 pages.

(Continued)

*Primary Examiner* — Tan X Dinh
(74) *Attorney, Agent, or Firm* — Hollingsworth Davis, LLC

(57) ABSTRACT

A near-field transducer includes an enlarged transducer portion of plasmonic material extending from an input end to an output end, a surface of the transducer portion including a trench running between two raised portions of the plasmonic material, the trench extending at least partially from the input end to the output end. A peg of the plasmonic material is disposed on the output end of the transducer portion and extends from the output end toward the air bearing surface of a heat assisted magnetic recording slider.

19 Claims, 19 Drawing Sheets

(56) References Cited

U.S. PATENT DOCUMENTS

2012/0039155 A1\* 2/2012 Peng et al. ............... 369/13.33
2012/0105996 A1   5/2012 Katine et al.
2014/0016448 A1\* 1/2014 Challener et al. ........ 369/13.33
2014/0133283 A1\* 5/2014 Maletzky et al. ........ 369/13.33

OTHER PUBLICATIONS

U.S. Appl. No. 13/550,280, filed Jul. 16, 2012, Challener et al.
Shyroki et al., "Dielectric Multilayer Waveguides for TE and TM Mode Matching", J. Opt. A: Pure Appl. Opt. 5, 2003, pp. 192-198.

\* cited by examiner

TRENCHED NEAR-FIELD TRANSDUCER FOR HEAT ASSISTED MAGNETIC RECORDING

SUMMARY

Various embodiments describe in this disclosure are generally directed to a near-field transducer (NFT) with a trench on its bottom surface configured to generate gap-plasmon surface waves that enhance the efficiency of the NFT, magnetic recording heads containing such an NFT, and a method for using such an NFT.

Some embodiments involve an NFT that comprises an enlarged NFT portion and a peg. The enlarged NFT portion is of plasmonic material extending from an input end to an output end, has a surface that includes a trench running between two raised portions of the plasmonic material and the trench extends at least partially from the input end to the output end. The peg of the plasmonic material disposed on and extending from the output end of the transducer portion.

Some embodiments involve a magnetic recording head that includes an NFT, a peg, a waveguide, and a magnetic write pole. The NFT includes an enlarged transducer portion of plasmonic material that extends from an input end to an output end, has at least one surface of the transducer portion that includes a trench disposed between two raised portions of the plasmonic material and the trench extends at least partially from the input end to the output end. The peg is of the plasmonic material disposed on and extending from the output end of the transducer portion. The waveguide core is configured to deliver light to the near field transducer. The magnetic write pole positioned where the NFT is disposed between the waveguide core and the magnetic write pole.

Some embodiments involve a method of operating an NFT. Light propagating through a wave guide is focused onto an NFT. The NFT comprises an enlarged transducer portion and a peg portion. The enlarged transducer portion comprises a plasmonic material extending from an input end to an output end of the enlarged transducer portion, has at least one surface that includes a trench disposed between two raised portions of the plasmonic material. The trench extends at least partially from the input end to the output end. The peg comprises the plasmonic material and is disposed on and extends from the output end of the enlarged transducer portion. The NFT is excited in response to the light, causing the NFT to generate plasmonic surface waves including gap-plasmon surface waves generated by the trench that enhance plasmonic coupling efficiency between the NFT and a magnetic media disposed proximate to the NFT.

BRIEF DESCRIPTION OF THE DRAWINGS

In all of the figures, similar numbers are used to illustrate similar elements. Drawings are not to scale unless otherwise indicated.

DETAILED DESCRIPTION

Figure 1:
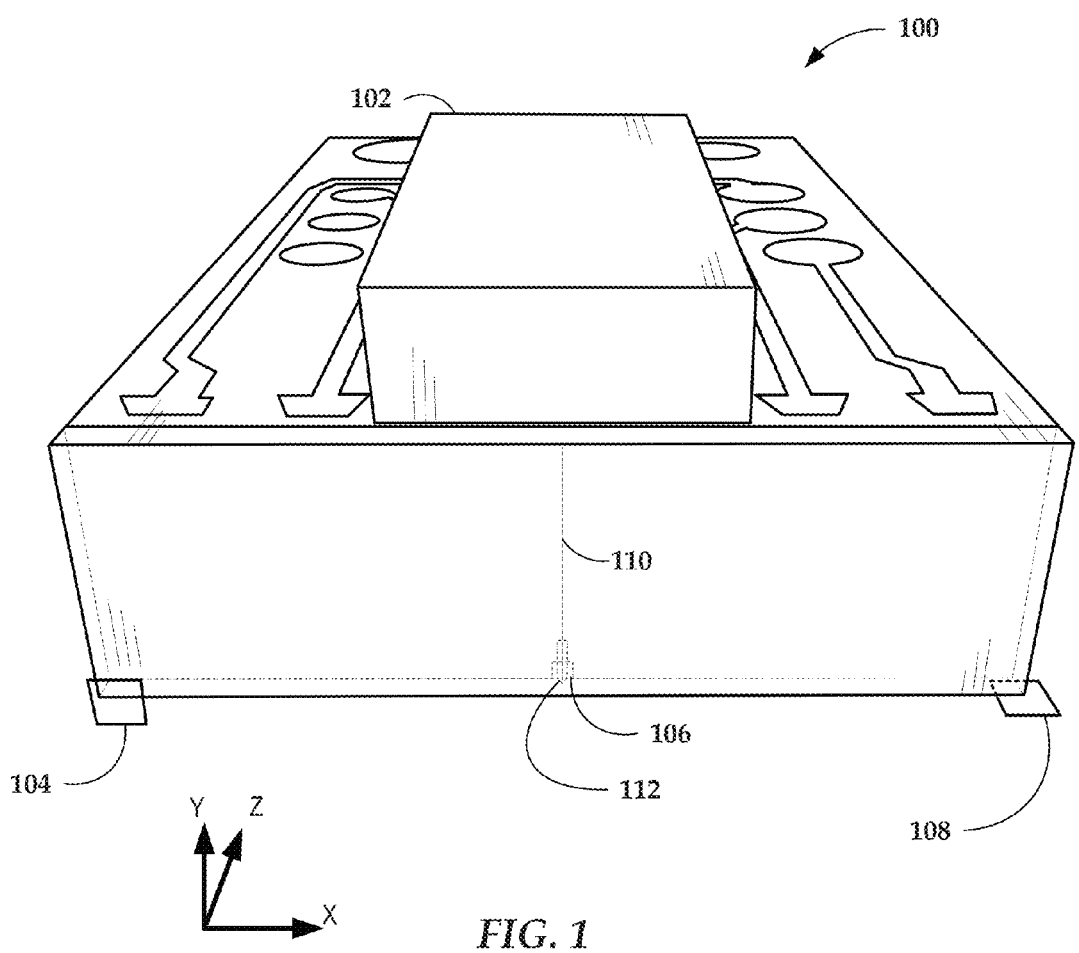
FIG. 1 is an illustration of a heat assisted magnetic recording slider with an NFT.

Methods and devices relating to a near field transducer (NFT) having a trench disposed in at least one surface are described. The NFT described herein may be useful, for example, in a heat-assisted magnetic recording device.

As the magnetic grain size is reduced to increase the storage density in a magnetic storage media, the grains become superparamagnetic, causing their magnetic state to become thermally unstable and the magnetized grains to gradually lose a particular magnetic state over time. Materials with a large magnetic anisotropy can support smaller grains and larger storage densities. However, the coercivity of high-anisotropy materials is greater than the magnetic field that can be generated by a recording head.

Heat assisted magnetic recording (HAMR) and the like in magnetic recording overcomes this problem by localized heating of the storage media above its Curie point to reduce its coercivity to zero while data is being stored in it. Optical energy must be efficiently delivered and confined to a spot in the medium that is much smaller than the diffraction limit so that neighboring tracks are not heated. Heating and cooling of the medium must occur within about 1 nanosecond (ns) of less in order to achieve the necessary data rates, to generate a large thermal gradient for sharp bit edge definition, and to ensure that the recorded data are thermally stable during cooling to ambient. Heating the media at the precise point that the data is stored, such as by selectively directing electromagnetic energy from a laser to the media, temporarily reduces the magnetic anisotropy of the media. After cooling, the magnetic anisotropy returns to the relatively high value to stabilize the stored magnetic state.

The tiny and confined optical spot needed for HAMR can be achieved by employing a near field transducer (NFT) in the recording head. Electromagnetic radiation in the visible to infrared frequencies can be directed to a surface of the NFT to excite resonant collective oscillations, also referred to as plasmons, at the interface between a plasmonic metal with free electrons, such as gold (Au), copper (Cu), and silver (Ag) and a dielectric material such as $Al_2O_3$, $SiO_2$, $Ta_2O_5$, and $SiN_x$. Sometimes more than one dielectric may be used with different indexes of refraction to achieve a desired beam characteristic. A desired excitation advantageously causes a high field due to the collective oscillations of electrons in the metal, increasing the interactions between light and matter. Part of the field tunnels into the nearby storage medium and by absorption raises its temperature.

NFTs may have a "poster antenna" configuration that comprises an enlarged transducer body and a peg extending from the output end of the transducer body. The body portion of an NFT may have various configurations, for example, the body portion of the NFT may have a rectangular shape or a disc shape. The NFT may be positioned in the magnetic slider so that the NFT has a surface proximate to a sloped magnetic pole such that the surface of the NFT substantially mirror the slope of the magnetic pole or a portion of the magnetic pole near the air bearing surface (ABS) of the recording head. Typically the magnetic pole is between 10 and 30 nm from the NFT at the ABS. The NFT absorbs optical energy, converts the optical energy to high energy surface plasmons, and transfers the energy into the storage media as it is being recorded.

FIGS. 1 and 2 depict an embodiment of a HAMR slider that includes an NFT. FIG. 1 is an illustration of an example of an HAMR slider 100 from the viewing perspective of its trailing edge 104 or along the z-direction. A laser diode module (102) emits a beam of light that is carried by a waveguide 110 to a planar solid immersion mirror (PSIM) or (SIM) 106. The SIM focuses the laser light onto an NFT 112. In some embodiments, the NFT comprises an enlarged transducer portion 114 of plasmonic material and a peg 116.

Figure 2A:
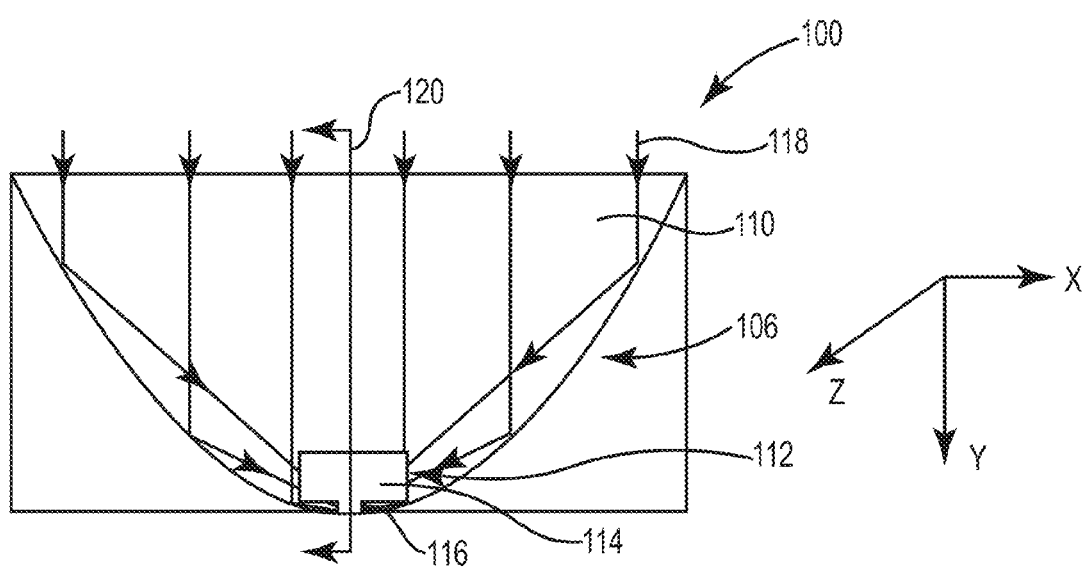
FIG. 2A is a schematic showing an embodiment of an NFT placed in a planar waveguide near the focusing spot formed by a solid-immersion-mirror (SIM), a parabolic mirror fabricated in the planar waveguide.

FIG. 2A is a schematic of a portion of the xy-plane of the HAMR slider device 100 magnified to show the region containing NFT 112 placed in a planar waveguide core 110 near the focusing spot formed by a solid immersion mirror (SIM). The NFT 112 shown in FIG. 2A includes an enlarged transducer portion 114 and a peg 116 extending below NFT body 114. Below peg 116 is the ABS 108 of the HAMR slider which is configured to fly above a magnetic media (140 shown in FIG. 2B). In operation, light 118 from the laser is propagated through waveguide core 110 and focused by SIM 106 onto NFT 112. The NFT 112 is designed to achieve surface plasmon resonance in response to this concentration of light.

Figure 2B:
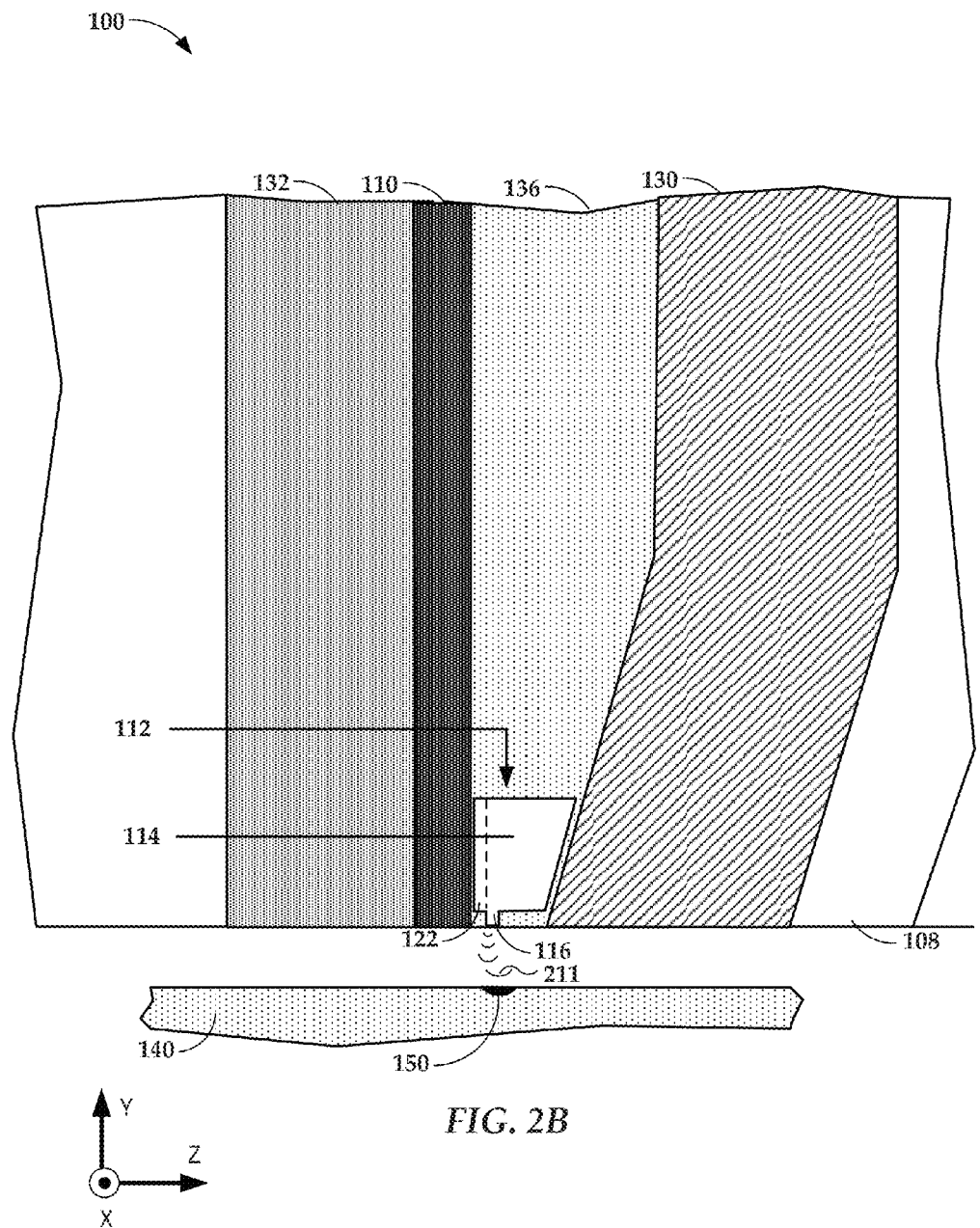
FIG. 2B is a schematic of a cross-sectional side view through the peg of the NFT in a planar waveguide showing the planar waveguide, the patch antenna NFT with a trench, a magnetic pole, and a magnetic storage media placed below the NFT.

As shown in FIG. 2B, at resonance, a high electric field surrounds the NFT 112 due to the collective oscillations of electrons at the metal surface. Part of this field 211 will tunnel into a storage medium 140 and get absorbed, thereby raising the temperature of a localized spot 150 on the media 140 as it being recorded. FIG. 2B is a block diagram of a cross-sectional side view through the middle of the peg of the poster antenna NFT in the planar waveguide core of FIG. 2A. As illustrated in FIG. 2B, the waveguide core 110 is disposed between dielectric cladding layers 132, 136. The waveguide core may comprise a 120 nm thick $Ta_2O_5$ core with an index of refraction n=2.08. $Al_2O_3$ with an index of refraction n=1.65 can be used for cladding disposed on one or both sides of the waveguide core.

NFT 112 is shown disposed in dielectric layer 132 between and proximate to magnetic pole 130 and waveguide core 110 in this embodiment. The enlarged transducer portion 114 of the NFT 112 includes a trench 122 that passes along one side of transducer portion 114. The trench 122 is positioned and designed to generate gap-plasmon surface waves that further enhance the efficiency of the NFT 112. The enlarged transducer portion 114 may include a heat sink which is in contact with the magnetic pole 130 so that the heat generated due to light absorption in the NFT 114 is removed through the pole 130.

As illustrated in FIG. 2B, in some embodiments, the trench 122 extends from the input end to the output end of the enlarged transducer portion 114. In other embodiments, the trench only extends part way from the output end toward the input end. Both configurations can enhance NFT efficiency. Some embodiments have the peg aligned with the centerline of the enlarged transducer portion. In some of these embodiments, the peg is also aligned with the trench. The peg and the trench may have substantially equal widths. In some of embodiments, the peg is offset from the trench in a direction normal to the surface of the enlarged transducer portion.

Figure 3A:
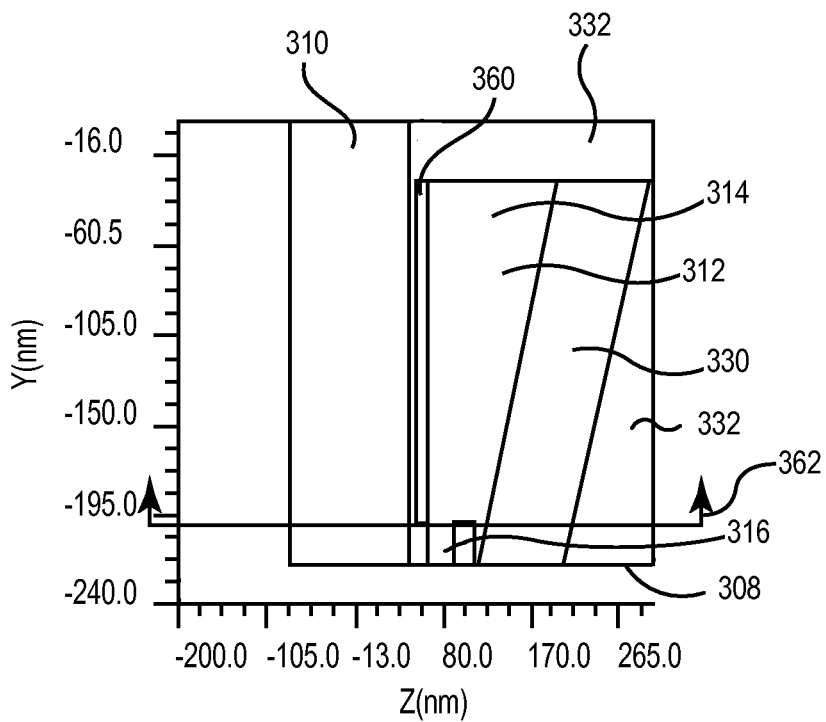
FIG. 3A is a cross-sectional side view of an NFT with a trench extending the entire length of the waveguide core-facing surface of the NFT.
Figure 3B:
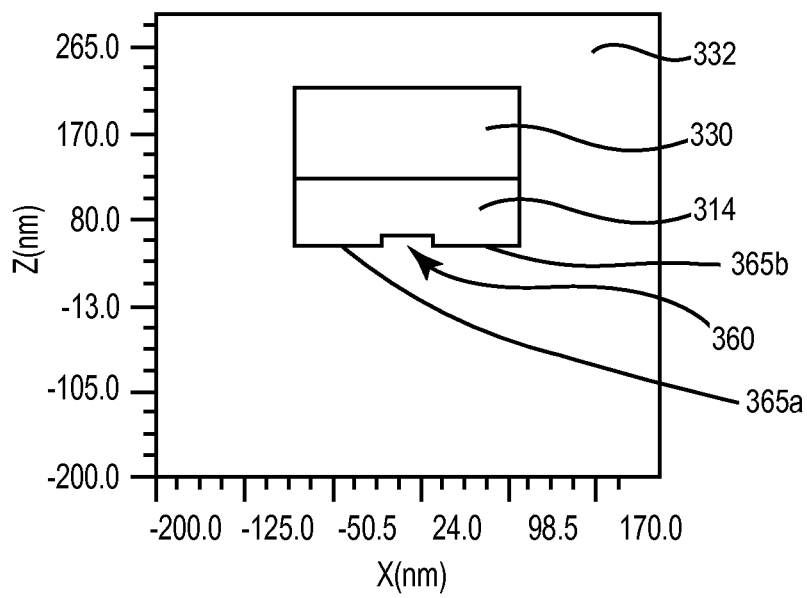
FIG. 3B is a schematic showing the cross-section of the NFT of FIG. 3A looking up and rotated 90 degrees left and showing the trench, NFT, and magnetic pole.

In embodiments described herein, the NFT has a poster antenna configuration comprising a peg and a three dimensional enlarged transducer portion. The dimensions of the NFT may be selected to achieve a specified efficiency. For example, in various implementations the transducer portion may have a rectangular or cylindrical shape and a peg that extends from an output surface of the transducer portion towards the ABS. The transducer portion may have surface that follows a sloped magnetic pole, resulting in a variable thickness in the z direction (down-track direction). FIGS. 3A and 3B show cross sections of an NFT in accordance with some embodiments in the zy and xz planes, respectively.

FIG. 3A depicts a portion of a HAMR slider including an NFT 312 arranged in the slider between a waveguide core 310 and a sloped magnetic pole 330 in accordance with an embodiment. The NFT comprises a plasmonic material such as gold (Au), copper (Cu), and silver (Ag) and is at least partially embedded in a dielectric material such as $Al_2O_3$, $SiO_2$, $Ta_2O_5$, and $SiN_x$. The NFT 312 includes an enlarged transducer portion 314 and peg 316. The surface of the transducer portion 314 that is proximate waveguide core 310 includes a trench 360. In this embodiment, the trench 360 extends the entire length of the enlarged transducer portion 314. In the illustrated embodiment, angled magnetic pole 130 is in contact with the surface of transducer portion 314 of NFT 312 opposite the NFT surface that includes the trench 360. The output end of peg 316 extends to or near the ABS 308. A surface of the peg 316 may be arranged to be in the same plane as the bottom of the trench 350. In various embodiments, the trenched surface of the NFT may be within the waveguide core or may be up to about 50 nm from the waveguide core, e.g., 10 nm from the waveguide core.

FIG. 3B shows the cross-section of the NFT of FIG. 3A rotated 90 degrees left along xz viewing plane 362. FIG. 3B shows the trench 360 disposed between two raised portions 365a, 365b of the plasmonic material of the transducer portion 314. The magnetic pole is arranged proximate to and/or in contact with the transducer portion 314 along the surface opposite the surface that includes the trench 360.

Figure 3C:
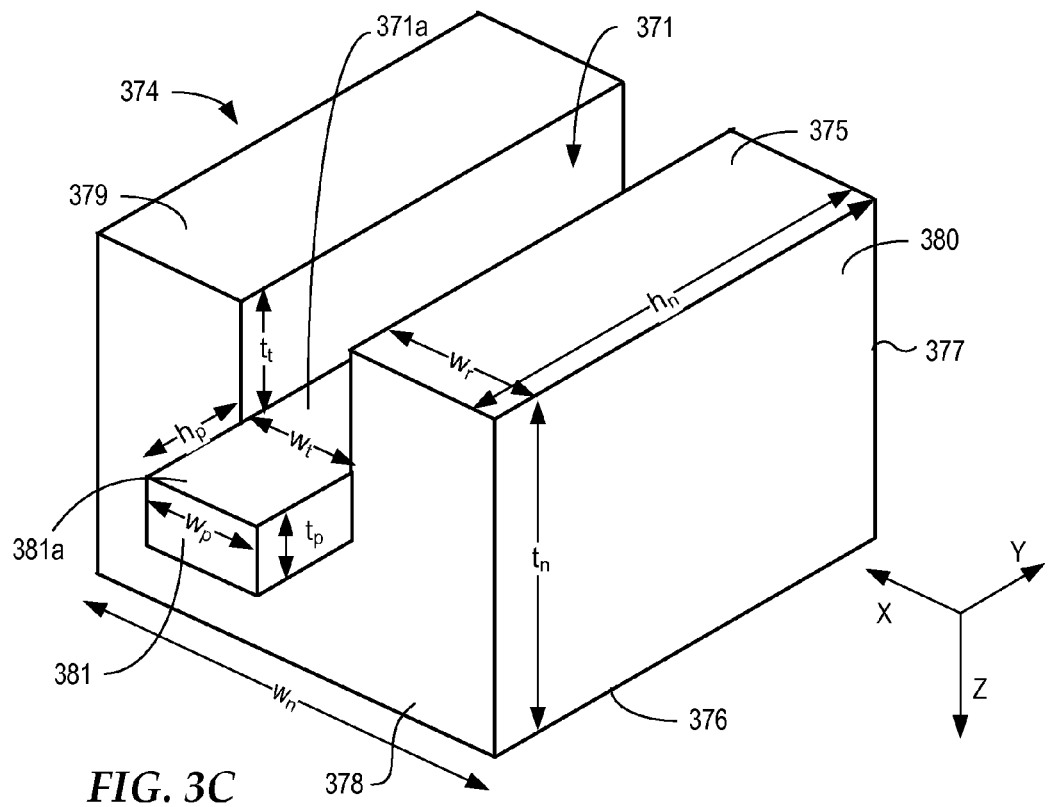
FIG. 3C is a perspective view of an NFT rotated to better show the trench.

FIG. 3C is a perspective view of an NFT in accordance with some embodiments. The NFT shown in FIG. 3C includes a rectangular shaped transducer portion 374 having a trenched surface 375, an opposing surface 376, an input end 377 and an output end 378. The trenched surface 375 of the transducer portion 374 includes a trench 371 disposed between raised portions 379, 380 of plasmonic material. In this embodiment, the trench 371 extends the entire length of transducer portion 374 from the output end 378 to the input end 377. The trench 371 has a bottom surface 371a that is in the same plane as the top surface 381a of peg 381 which is aligned with the trench 371.

As shown in FIG. 3C, the transducer portion 374 of the NFT may have an overall thickness, $t_n$, in the z (down track direction) in a range of about 40 nm to about 200 nm; an overall width, $w_n$, in the x (cross-track direction) in a range of about 100 nm to about 500 nm; and an overall height, $h_n$, in a range of about 100 nm to about 200 nm. The raised portions may a width, $w_r$, in a range of about 50 nm to about 100 nm. The trench may have a thickness (depth), $t_r$, in a range of about 5 nm to about 50 nm and a width, $w_t$, in a range of about 5 nm to about 100 nm. The peg may have a width, $w_p$, in a range of about 5 to about 100; a thickness, $t_p$, in a range from about 10 to about 60 nm; and a height, $h_p$, in a range of about 5 nm to about 50 nm. In some cases, width of the peg is the same as the width of the trench.

Figure 3D:
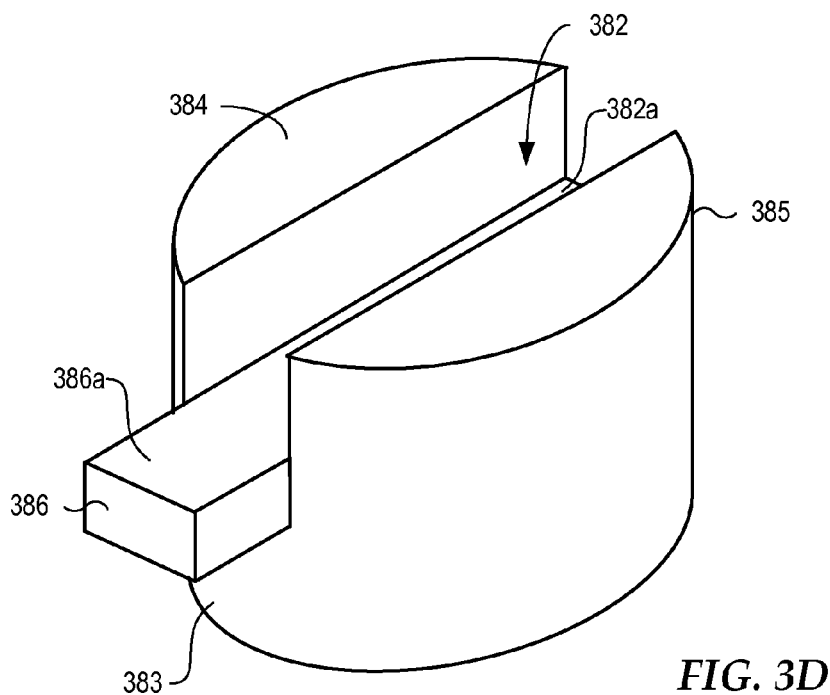
FIG. 3D is a perspective view of an NFT having a disc-shaped enlarged transducer portion and having a trench.

FIG. 3D is a perspective view of an NFT similar in some respects to the NFT of FIG. 3C but having an enlarged transducer portion that is disc-shaped. As seen in FIG. 3C, the trench 382 extends the entire length of transducer portion 384 from an output end 383 of the transducer portion 384 to an input end 385 of the transducer portion 384. The bottom surface of trench 382a is in the same plane as the top surface of peg 386.

The NFT shown in FIG. 3D may have dimensions similar to those provided above with reference to FIG. 3C. In some cases, the diameter of the enlarged transducer portion may be in a range of about 100 nm to about 500 nm.

Operation of HAMR slider using an NFT having a trench extending all the way from the input end to the output end was studied. The model considered a waveguide composed of a 120 nm thick $Ta_2O_5$ core with index of refraction n=2.08. $Al_2O_3$ was used as a cladding layer, n=1.65. The NFT simulated was a poster antenna, comprising a peg, a cube-shaped enlarged transducer portion. The slider included a sloped FeCo magnetic pole (n=3.17+j 3.95) having a configuration similar to the magnetic pole shown in FIG. 2B. The magnetic pole was simulated as a strip of 180 nm wide along x direction and 100 nm high along z direction, sloped at an angle of 26.56 degrees from y direction. The material for the NFT was gold, n=0.188+j 5.39. The enlarged transducer portion was simulated as a cube 180 nm wide along x direction (cross-track) and 170 nm high along y-direction. The peg was 40 nm along x direction and 30 nm along z direction (down track). In this simulation, the NFT size was been optimized for efficiency. The NFT-pole spacing on the air-bearing surface is 20 nm.

The media was simulated as a 12.6 nm thick Fe layer (n=2.94+j 3.41), a 10-nm MgO layer (n=1.70), and a 60-nm Cu layer (n=0.26+j 5.29) on a glass substrate (n=1.50). The laser light wavelength in vacuum was λ=830 nm.

Figure 3E:
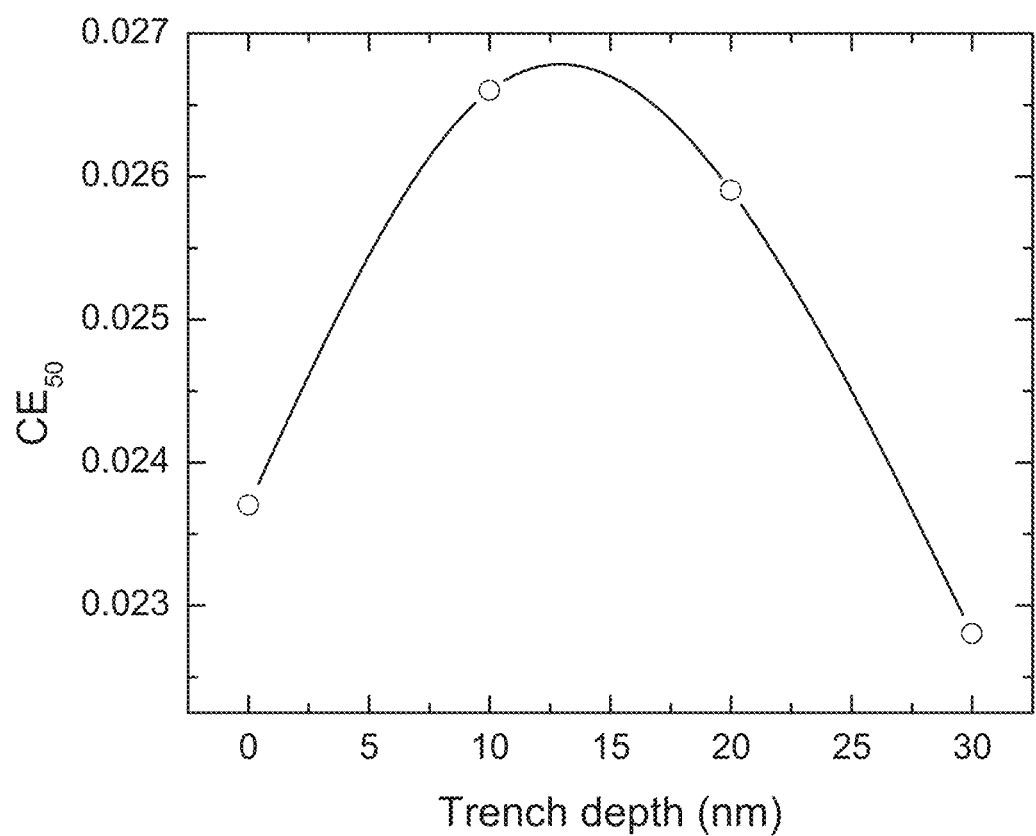
FIG. 3E is a graph of the NFT efficiency for an NFT similar to that shown in FIG. 3A as a function of trench depth along the z-direction where the trench width is 40 nanometers (nm) and the trench length is that of the NFT.

FIG. 3E is a graph of the coupling efficiency of an NFT having the characteristics described above as a function of trench depth along the z-direction where the trench width is the same as the peg width of 40 nm and the trench length is that of the transducer portion of the NFT. In this simulation, efficiencies were determined for four different trench depths: 0, 10, 20, and 30 nm with the raised portions of plasmonic material that form the trench sides being increased or decreased to create more or less trench depth. NFT coupling efficiency, $CE_{50}$, is defined as the light absorption in the recording layer and in a footprint of 50 nm by 50 nm. It is evident from the graph of FIG. 3E that transducer efficiency is improved by about 15 percent at trench depths between about 10 nm and about 15 nm when compared to a similar NFT that does not include a trench.

Figure 4A:
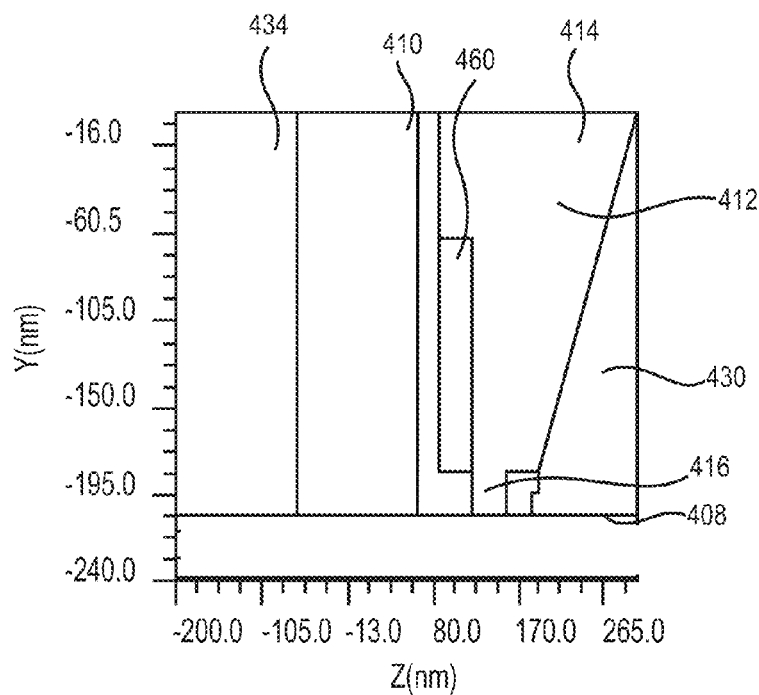
FIG. 4A is a block diagram of a cross-sectional side view of the NFT having a trench extending partway along the length of the waveguide-core-facing surface of the NFT.

In some implementations, the NFT includes trench that extends only part of the way between the input end and the output end of the enlarged portion of the NFT, as shown in FIG. 4A. FIG. 4A is a cross-sectional side view of a portion of a HAMR slider showing an NFT 412 disposed between the waveguide core 410 and the sloped magnetic pole 430. The NFT 412 has an enlarged transducer portion 414 and a peg 416 extending from an output end of the transducer portion 414 towards the ABS 408 of the slider. The surface of the transducer portion 414 facing the waveguide core 410 includes a trench 460 extending from the output end of the transducer portion 414 partway towards the input end. The illustrated embodiment includes an angled magnetic pole 430 that is in contact or near to the surface of the transducer portion 414 opposite the trenched surface. NFT 412 is in contact with cladding 132 below transducer 112 except for the end of peg 116 that is an ABS 108. The bottom of trench 160 is in the same plane as the top of peg 116.

Figure 4B:
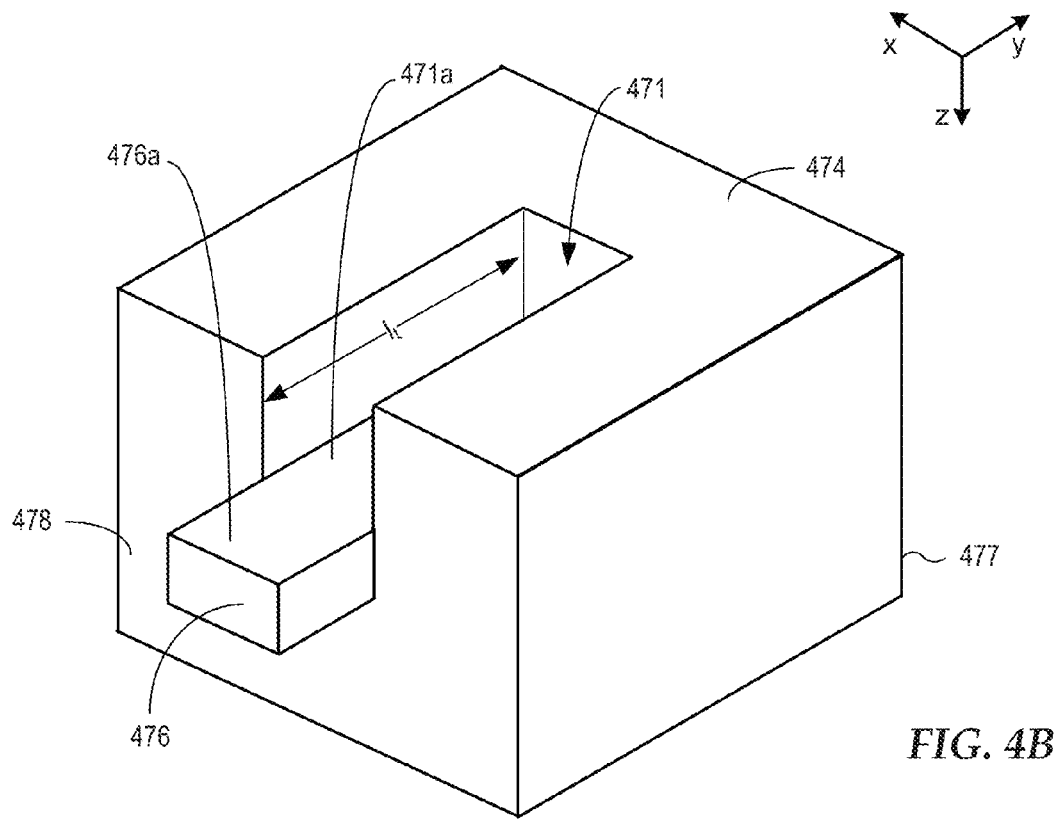
FIG. 4B is a perspective view of an NFT having a partial trench.

FIG. 4B is a perspective view of an NFT that includes a trench 471 extending part of the distance between the output and input ends 478, 477 of the transducer portion 474. Trench 471 extends part of the length of transducer portion 474 from output end 478 of the transducer portion 474 to some point short of input end 477 of the transducer portion 474. The bottom surface 471a of trench 471 is in the same plane as the top surface 476a of peg 476. The dimensions of the NFT shown in FIG. 4B may be similar to those discussed above in connection with FIG. 3C. The length, $l_t$, of the trench 471 may be about 10% to about 100% of the height, $h_n$, of the transducer portion 474.

Figure 4C:
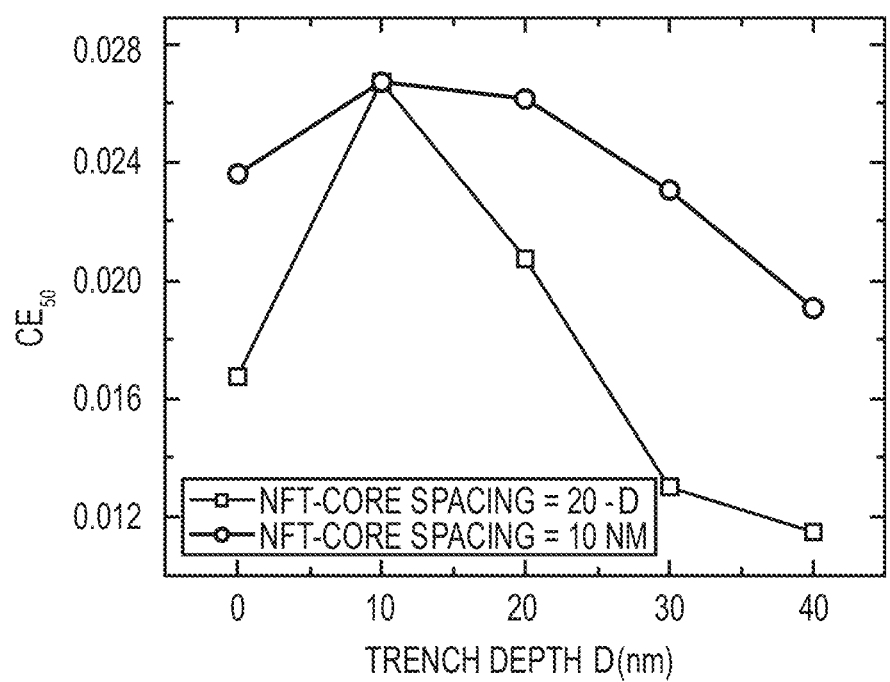
FIG. 4C is a graph of the NFT efficiency for an NFT similar to that shown in FIG. 4A as a function of trench depth along the z-direction where the trench width is the peg width of 40 nanometers (nm) and the trench length is less than that of the NFT.

FIG. 4C is a graph of the NFT efficiency of an NFT having a configuration similar to that shown in FIG. 4A. In this study, the depth in the z-direction of trench 160 was varied up to 40 nm. The space between wave core 134 and transducer portion 114 varied from 0 to 40 nm for different embodiments of this example set. The plasmonic material of the NFT was Au. In this example, the trench width was the same as the peg width of 40 nanometers (nm) and the trench length, $l_t$, was half of the height, $h_n$, of the transducer portion. The efficiency of this trenched NFT as a function of trench depth along the z-direction is shown for two different distances between the waveguide core and the transducer portion. This simulation considered a waveguide composed of a 120 nm thick $Ta_2O_5$ core with index of refraction n=2.08. $Al_2O_3$ was used as a cladding layer, n=1.65. The NFT simulated was a poster antenna, comprising a peg, a cube-shaped enlarged transducer portion. The slider included a sloped FeCo magnetic pole (n=3.17+j 3.95) having a configuration similar to the magnetic pole shown in FIG. 2B. The magnetic pole was simulated as a strip of 180 nm wide along x direction and 100 nm high along z direction, sloped at an angle of 26.56 degrees from y direction. The material for the NFT was gold, n=0.188+j 5.39. The enlarged transducer portion was simulated as a cube 180 nm wide along x direction (cross-track) and 170 nm high along y-direction. The peg was 40 nm along x direction and 30 nm along z direction (down track). In this simulation, the NFT size was been optimized for efficiency. The NFT-pole spacing on the air-bearing surface is 20 nm.

The media was simulated as a 12.6 nm thick Fe layer (n=2.94+j 3.41), a 10-nm MgO layer (n=1.70), and a 60-nm Cu layer (n=0.26+j 5.29) on a glass substrate (n=1.50). The laser light wavelength in vacuum was λ=830 nm.

Coupling efficiency, $CE_{50}$, was determined with an NFT-core spacing of 10 nm and an NFT-core spacing of 20–D, where D is the trench depth. Five different trench depths: 0, 10, 20, 30, and 40 nm were considered with the thickness (in the z-direction) of the raised portions of plasmonic material of the transducer portion being decreased or increased to create less or more trench depth. The plot of the results shows that for this example the maximum transducer efficiency was achieved for a core-to-transducer distance of 10 nm with a trench having a depth of approximately 10 nm. The coupling efficiency at 10 nm trench depth was over 0.27.

Figure 5A:
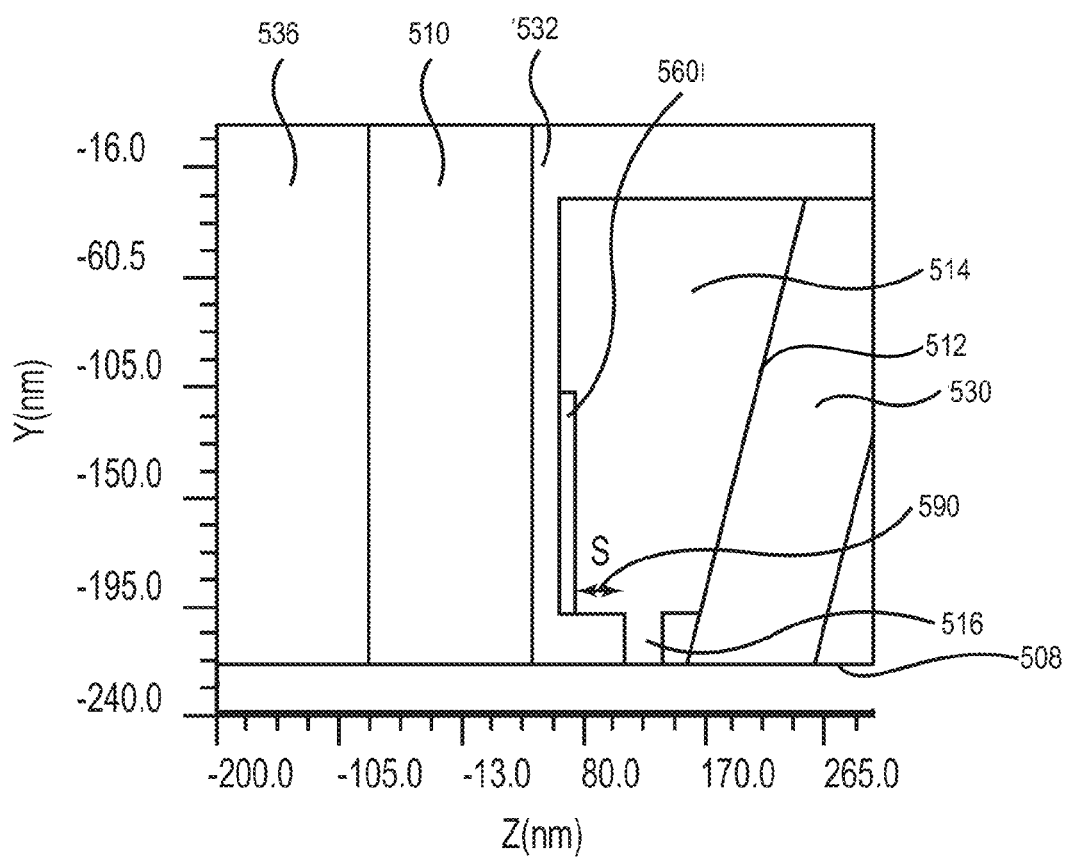
FIG. 5A is a cross-sectional side view of an NFT with an offset between the bottom of the trench and the peg.

FIG. 5A is a block diagram of a cross-sectional side view of the NFT 512 that has an offset, S, 590 from the bottom surface of the trench to the surface of the peg 516. The configuration shown in FIG. 5A has a total offset from the peg 516 to the waveguide core 510 of S+the thickness (depth) of the trench, $t_r$. In the illustrated embodiment, the enlarged transducer portion 514 encompasses a trench 560 that extends from the output end along a surface of the enlarged portion 514 part of the way towards the input end of the enlarged portion 514. The peg 516 extends from the output end of the enlarged portion towards the ABS 508. The depth (thickness in the z-direction) of trench 560 may be on the order of about 10 nm in some configurations. FIG. 5A shows the angled magnetic pole 530 proximate the NFT 512. Other portions of the slider 532, 536 may be or comprise a dielectric material, e.g., such as a metal oxide, which serves as the waveguide cladding. The space between waveguide core 510 and transducer portion 514 on the order of about 10 nm.

Figure 5B:
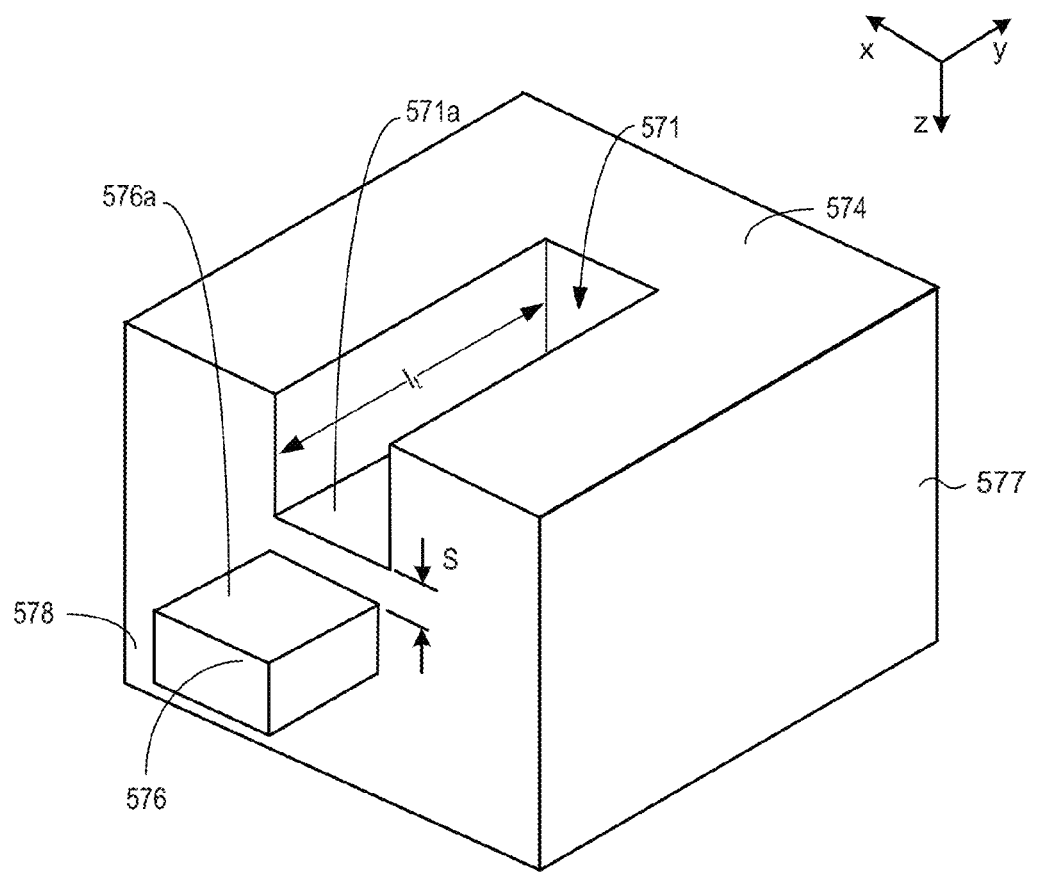
FIG. 5B is a perspective view of an NFT with the NFT rotated to better show the trench and offset.

FIG. 5B is a perspective view an NFT that shows the trench and offset space, S. The dimensions of the NFT may be similar to dimensions previously described, e.g., in connection with the NFTs of FIGS. 3C and 5B. Trench 571 extends the partway up the length of transducer portion 574 from output end 578 of transducer portion 574 to some point short of input end 577 of transducer portion 574. The bottom surface 571a of trench 571 is in a different plane that is parallel to the plane of the surface 576a of peg 576. The bottom surface 571a of the trench 571 is offset from the surface 576a of peg 576 by offset, S, where S may be between about 5 nm and 100 nm, for example.

Figure 5C:
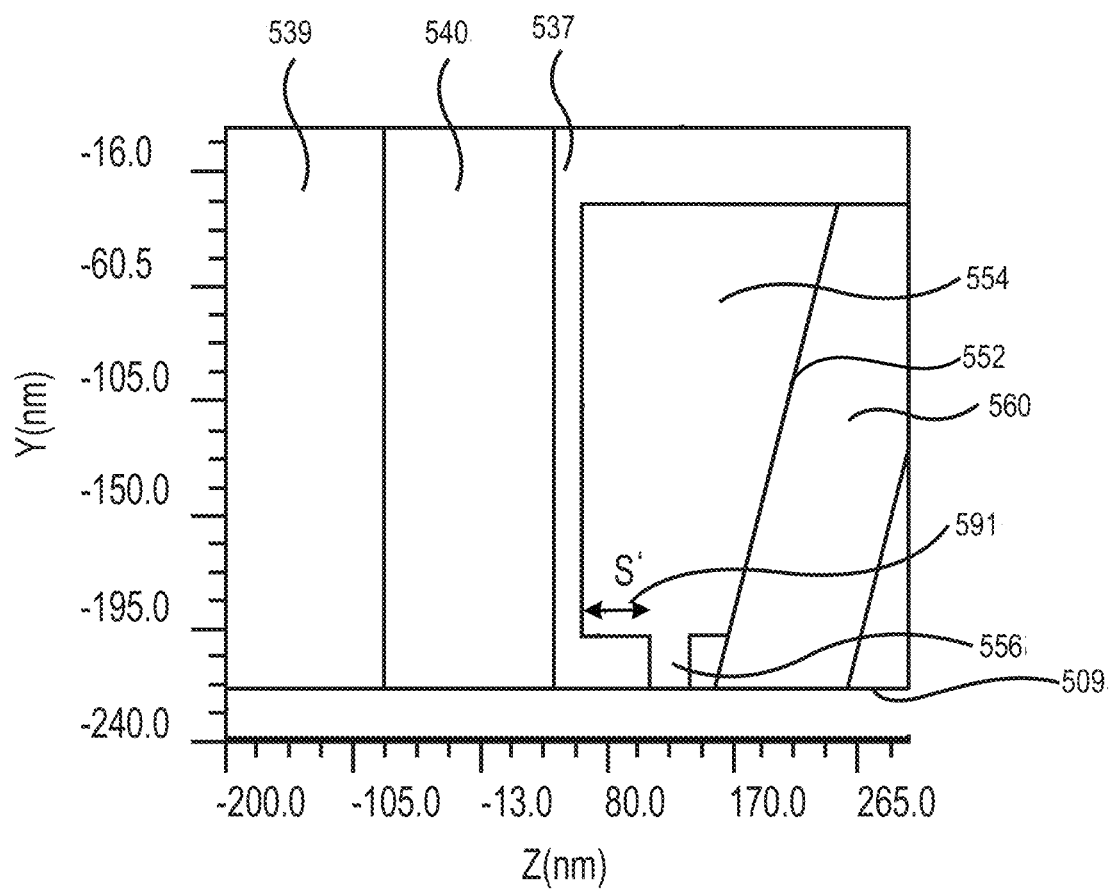
FIG. 5C is a cross-sectional side view of an NFT without a trench and with an offset between the peg and the surface of the NFT facing the waveguide core.

FIG. 5C is a block diagram of a cross-sectional side view of the NFT 552 without a trench. wherein the peg is offset by an offset, S', from the surface of the enlarged portion 554 and without a trench. FIG. 5C shows the total offset of the peg, S', is equal to S+the thickness (depth) of the trench, $t_r$, in FIG. 5A. The offset peg 556 extends from the output end of the enlarged portion 554 towards the ABS 508. FIG. 5C shows the angled magnetic pole 560 proximate the NFT 552. Other portions of the slider 537, 539 may be or comprise a dielectric material, e.g., such as a metal oxide, which serves as the waveguide cladding. The space between waveguide core 540 and transducer portion 554 on the order of about 10 nm.

Figure 5D:
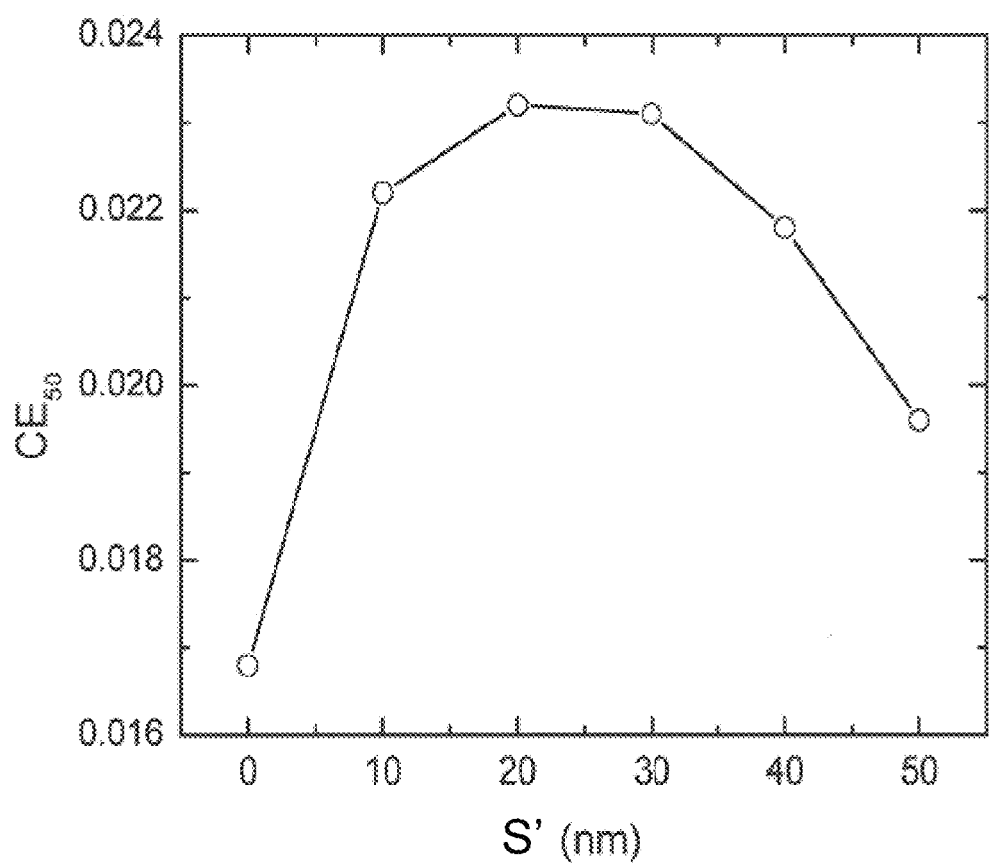
FIG. 5D is a graph of the NFT efficiency for an NFT similar to that shown in FIG. 5C as a function offset, S'.

FIG. 5D is a graph that shows transducer efficiency as a function of S' as the peg 556 is moved away from the waveguide core-facing surface of the enlarged portion 554. It will be appreciated from this graph that the transducer efficiency is optimal for this embodiment in a range of about 10 to 35 nm.

Figure 6:
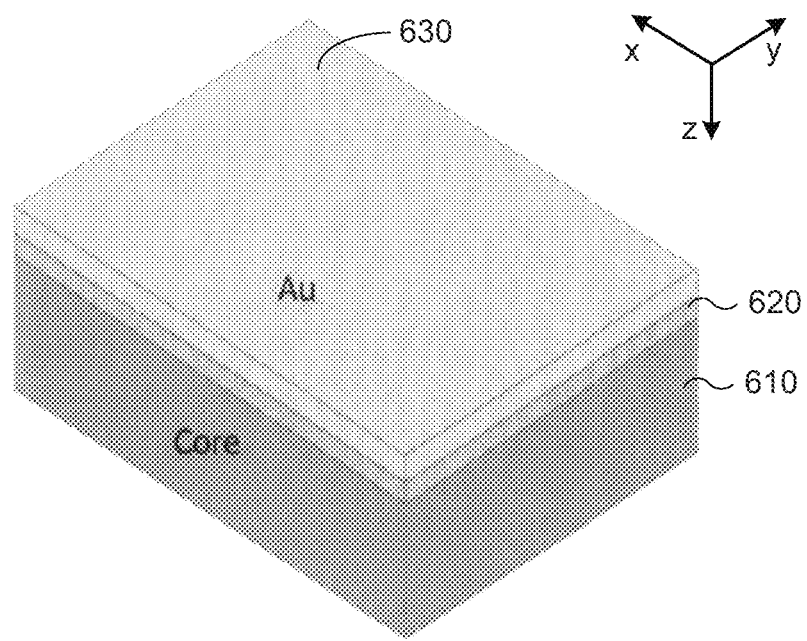
FIGS. 6-16 are schematic views of an NFT subassembly during various stages of a fabrication process.

A fabrication process is described as an example of how to make an embodiment of the NFTs, e.g., similar to the NFT shown in FIG. 4A and described above. The process is detailed in FIGS. 6-16. FIG. 6 illustrates the structure after deposition of core to NFT spacing (CNS) cladding material on the core and deposition of a gold (Au) layer on the CNS. In this example, 20 nm of CNS 610 is deposited over a 125 nm waveguide core layer 620. A 25 nm layer of Au layer 630 is deposited. An adhesion layer (not shown) is disposed between the Au layer 630 and the CNS 610.

Figure 7:
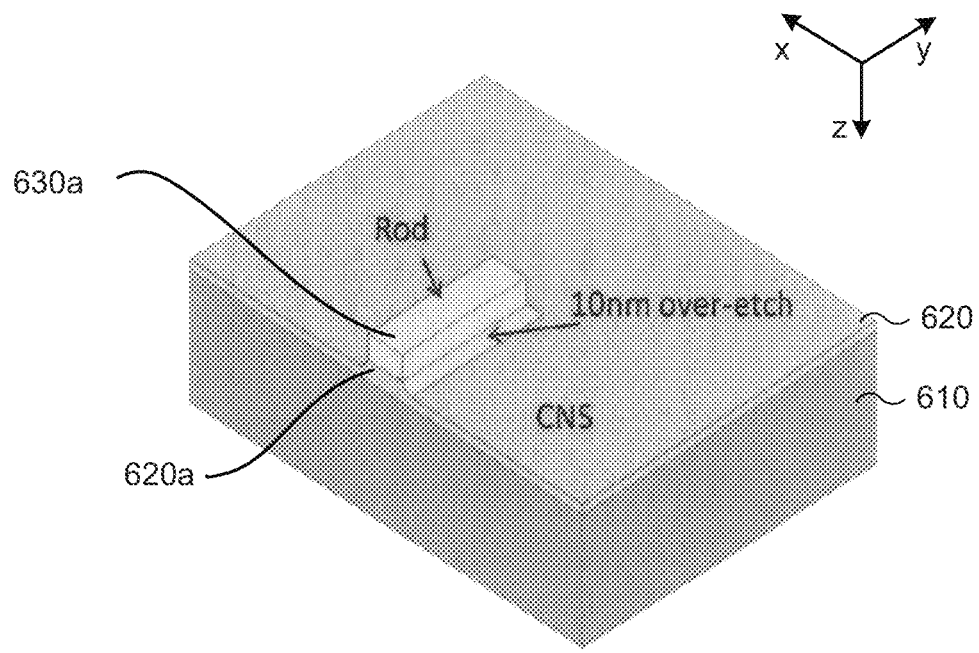

In FIG. 7, a rod that includes an Au portion 630a and a CNS portion 620a is formed. The rod is formed by depositing and patterning a layer such as a photoresist or an amorphous Carbon (aC) hard mask. The rod is milled, e.g., with Ion Beam Etch (IBE) with the photoresist or aC as the mask. The mill parameters can be carefully controlled such that CNS layer 620 is over milled by 10 nm. The photoresist or aC mask is removed by strip or ash process. The strip process dissolves the photoresist in a chemical solution. The ash process etches the photoresist in $O_2$ plasma after the rod is milled.

Figure 8:
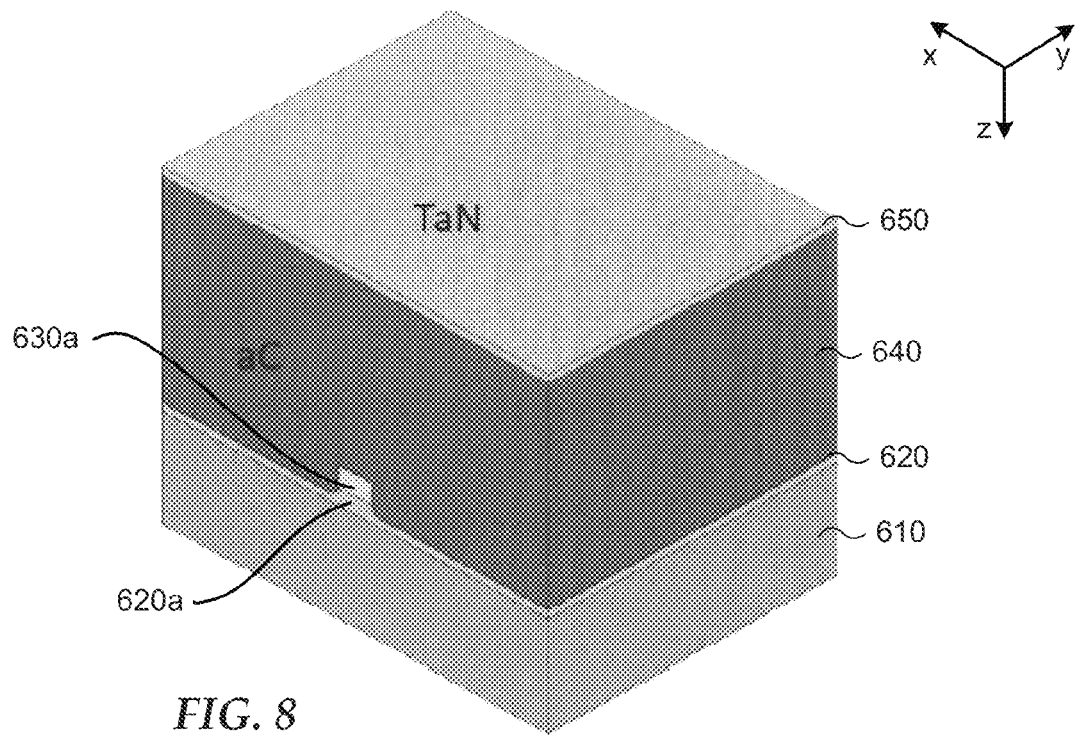

In FIG. 8, an aC layer 640 having a thickness between 200 and 250 nm is deposited over the Au portion of the rod 630a and surrounding CNS layer 620 followed by 12.5 nm deposition of TaN 650 over the aC 640 layer as a hard mask.

Figure 9:
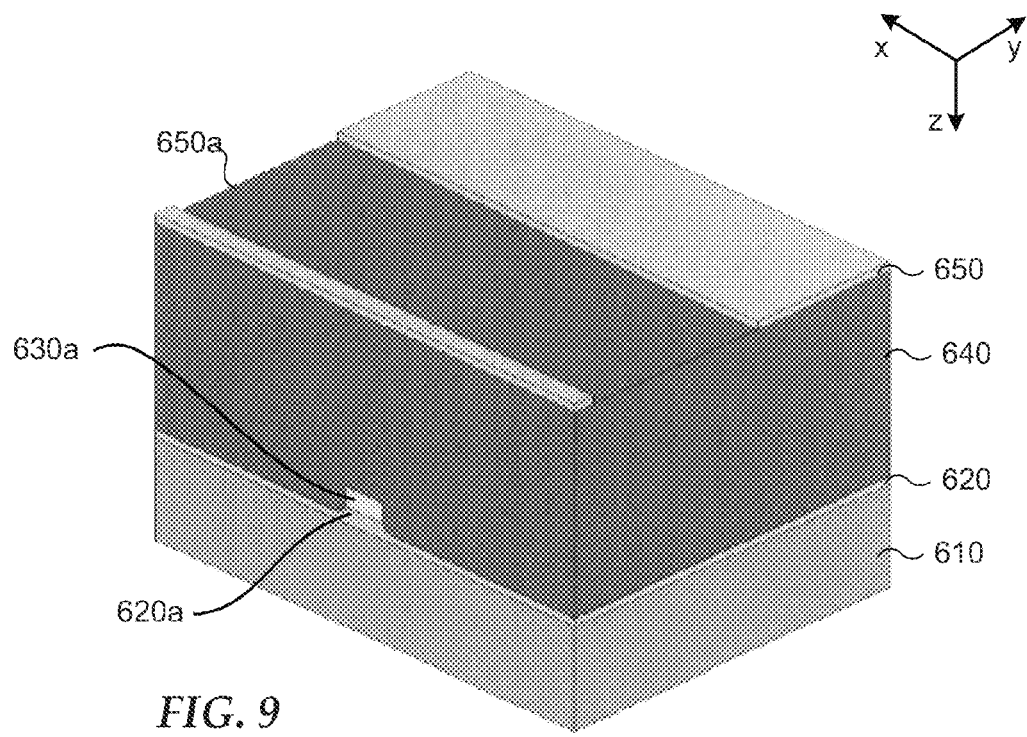
Figure 10:
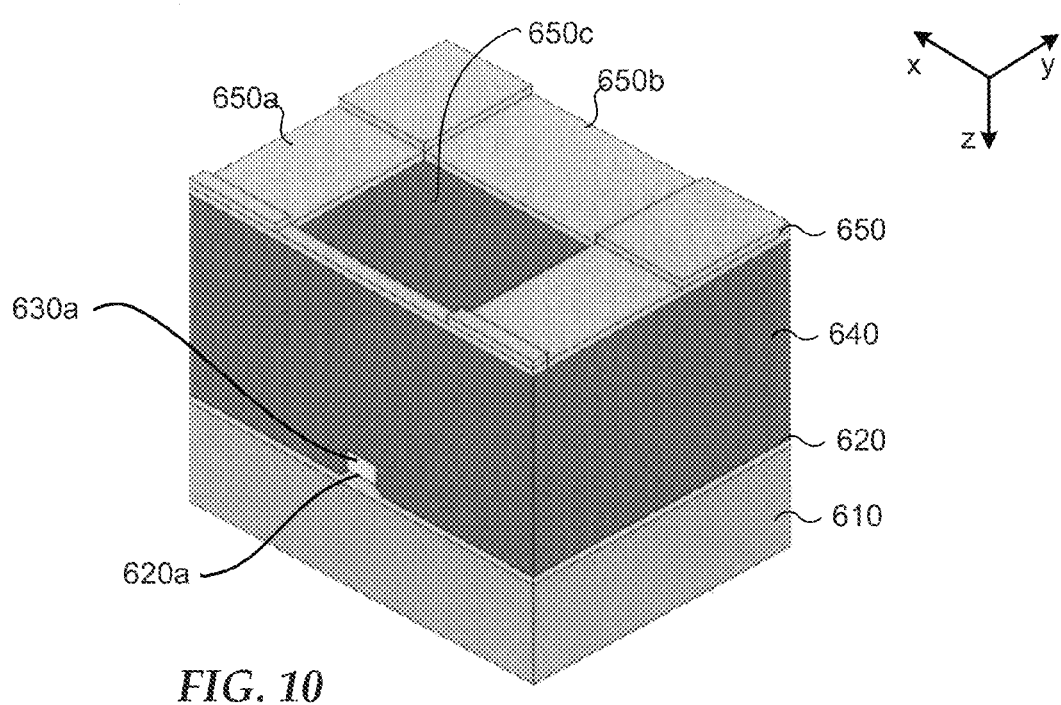
Figure 11:
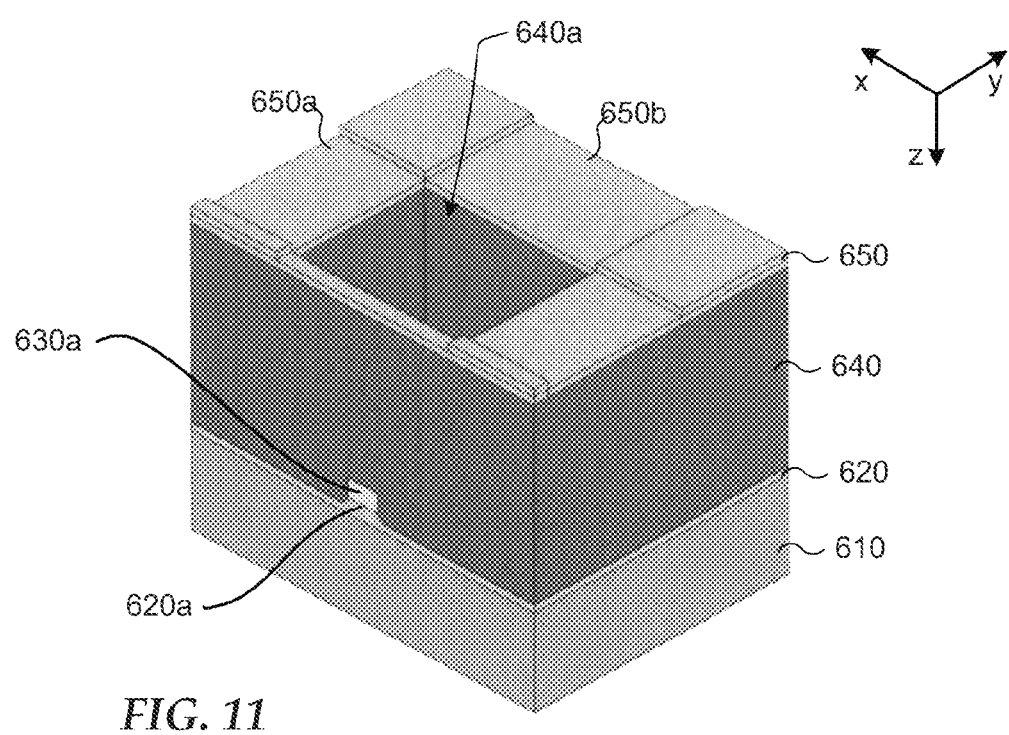

Double patterning is used to form a 180 by 230 nm rectangular shape with sharp corners. As seen in FIG. 9, the first patterning is to remove the TaN to open a 180 nm trench 650a in TaN layer 650 in the x-direction perpendicular to the length of the rod 630a. In FIG. 10, the second patterning is to liftoff another 10 nm thick layer of TaN 650 parallel to the length of the Rod to form a 230 nm wide trench 650b. These two TaN trenches 240 and 250 form a 180 by 230 nm opening 630c with sharp corners. As shown in FIG. 11, the next step involves the etching of a hole 640a in aC layer 640 through the opening 650c. Plasma etching, e.g., inductively coupled plasma (ICP) etch, is performed using the TaN layer as a hard mask. ICP parameters can be carefully adjusted so that the etching just stops on the CNS layer 620 and the sidewalls of the hole 640a are straight.

Figure 12:
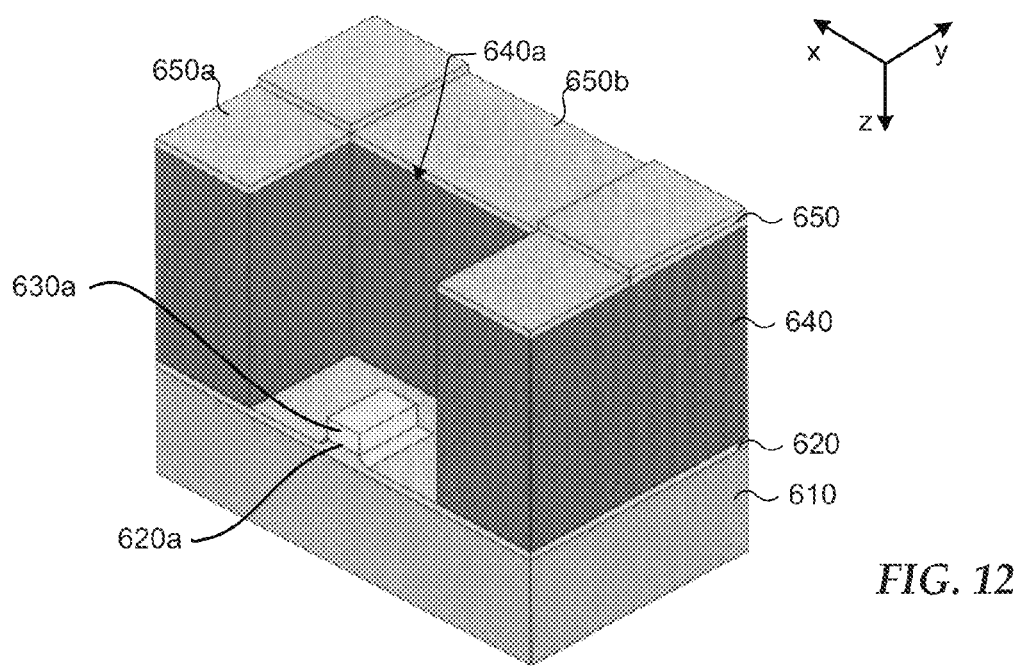

FIG. 12 is a cross-section of FIG. 11 showing portions of the CNS rod portion 620a and the Au rod portion 630a.

Figure 13:
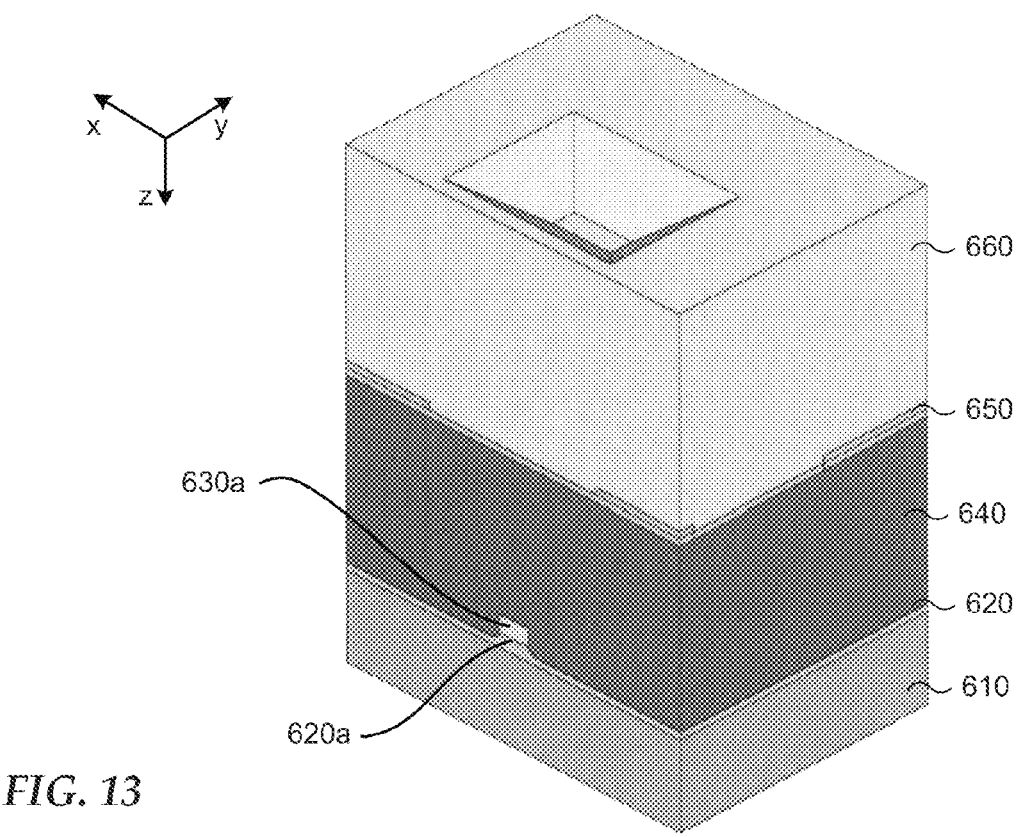

After formation of the hole 640a shown in FIG. 11, the hole 640a is filled with Au 660, as shown in FIG. 13. The Au can be deposited, for example using a sputter or plating method.

Figure 14:
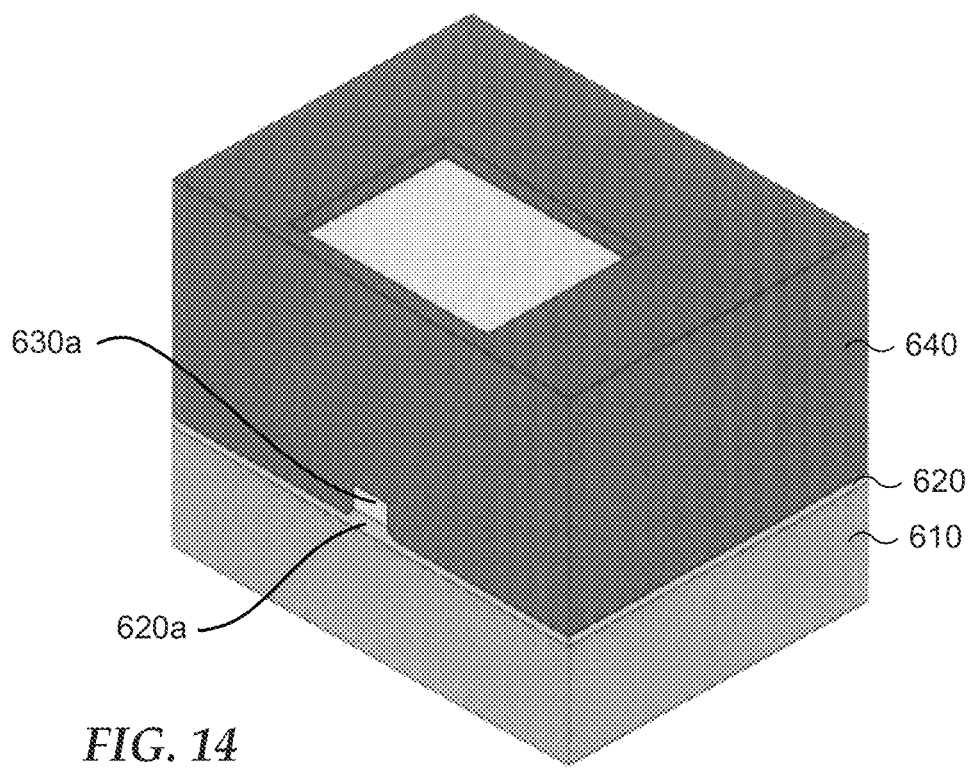

The next step involves removing the Au and TaN layers down to the top surface of the aC 230. FIG. 14 shows the NFT structure following this step. Removal of the Au and TaN layers (660, 650 shown in FIG. 13) can be performed by chemical mechanical polishing (CMP) and/or by high angle milling, for example.

Figure 15:
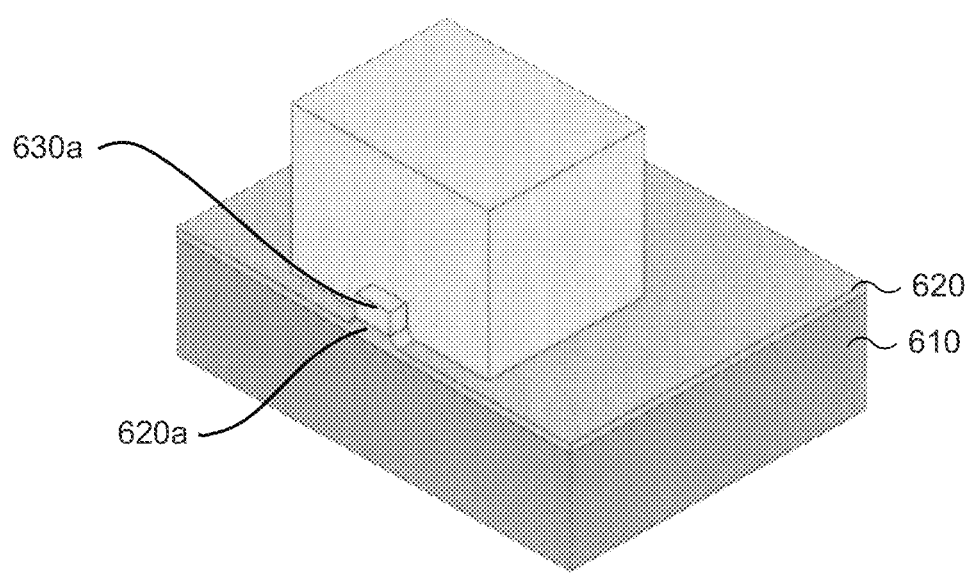
Figure 16:
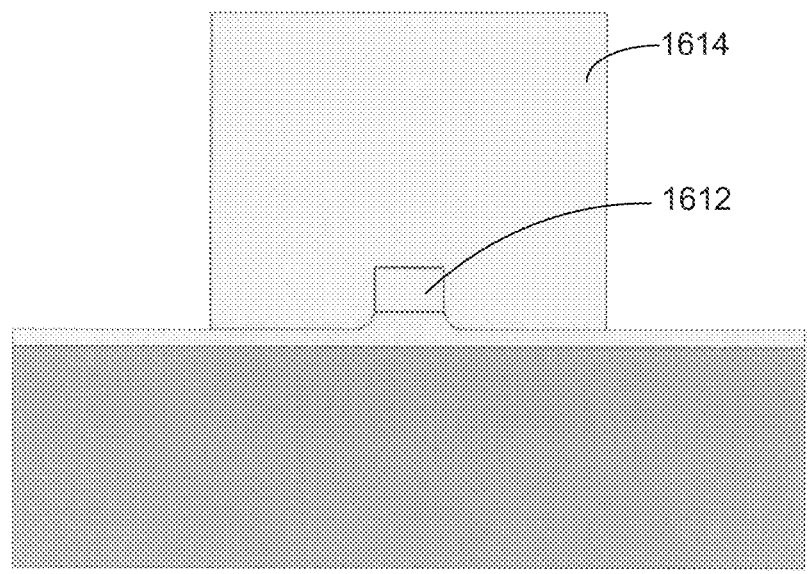

The aC mold 640 can be ashed away after the Au and TaN layers are removed from the surface. FIG. 15 shows the NFT structure following removal of the aC mold. The process detailed in FIGS. 6 through 15 results in the final NFT as shown in FIG. 16 having an enlarged portion 1614, a peg 1612, and a trench formed by the CNS rod portion that in this case extends from the output end of the enlarged portion to a point short of the input end of the enlarged portion. FIG. 16 is an ABS view of the final NFT structure.

Figure 17:
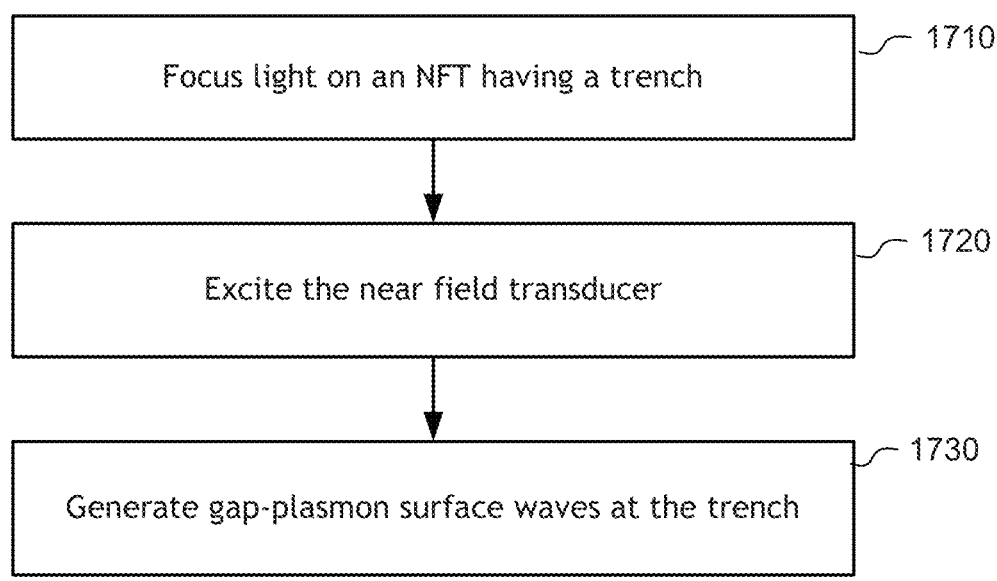
FIG. 17 is a flow diagram of the method of operating an NFT.

The NFTs in the various embodiments described herein are configured to generate gap-plasmon surface waves to enhance the efficiency of an NFT that includes an enlarged portion and a peg. A method of using an NFT is illustrated by the flow diagram of FIG. 17. Light from a light source is focused onto a near-field transducer, the near-field transducer comprising an enlarged transducer portion of plasmonic material extending from an input end to an output end, at least one surface of the transducer portion including a trench disposed between two raised portions of the plasmonic material, the trench extending at least partially from the input end to the output end and a peg of the plasmonic material disposed on and extending from the output end of the transducer portion. The focused light excites the enlarged portion of the NFT causing the enlarged portion to generate plasmon surface waves and causes the trench to generate gap-plasmon surface waves that enhance plasmonic coupling efficiency between the near field transducer and a magnetic media disposed proximate to the near field transducer.

The embodiments described herein are not meant to be restrictive to only the disclosed embodiment but encompasses other embodiments that perform the same functions.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A near-field transducer, comprising:
   an enlarged transducer portion of plasmonic material extending from an input end to an output end, a surface of the transducer portion including a trench running between two raised portions of the plasmonic material, the trench extending at least partially from the input end to the output end and configured to generate gap-plasmon surface waves; and
   a peg of the plasmonic material disposed on and extending from the output end of the transducer portion.

2. The near-field transducer of claim 1, wherein the peg is aligned with the trench.

3. The near-field transducer of claim 2, wherein the peg has a width that is substantially equal to a width of the trench.

4. The near field transducer of claim 1, wherein the trench extends from the input end to the output end.

5. The near-field transducer of claim 1, wherein the plasmonic material comprises gold.

6. The near-field transducer of claim 1, wherein the trench is aligned along a centerline of the transducer portion.

7. The near-field transducer of claim 6, wherein the peg is aligned with the trench.

8. The near-field transducer of claim 7, wherein the peg is offset from the trench in a direction normal to the surface of the transducer portion.

9. The near-field transducer of claim 1, wherein the transducer portion has a disc shape.

10. The near-field transducer of claim 1, wherein the transducer portion has a rectangular shape.

11. A heat assisted magnetic recording head, comprising:
    a near field transducer, comprising:
      an enlarged transducer portion of plasmonic material extending from an input end to an output end, at least one surface of the transducer portion including a trench disposed between two raised portions of the plasmonic material, the trench extending at least partially from the input end to the output end and dimensioned to generate gap-plasmon surface waves in response to excitation of the near field transducer; and
      a peg of the plasmonic material disposed on and extending from the output end of the transducer portion;
    a waveguide core configured to deliver light to and excite the near field transducer; and
    a magnetic write pole, wherein the near field transducer is disposed between the waveguide core and the magnetic write pole.

12. The magnetic recording head of claim 11, wherein the NFT displaced from the waveguide core.

13. The magnetic recording head of claim 11, wherein the peg is offset from the trench in a direction normal to the surface of the transducer portion.

14. The magnetic recording head of claim 11, wherein the trench extends partially between the input end and the output end.

15. The magnetic recording head of claim 11, wherein the trench extends fully between the input end and the output end.

16. The magnetic recording head of claim 11, further comprising a solid immersion mirror configured to focus the light from the waveguide onto the near-field transducer.

17. A method, comprising:
    focusing light propagating through a wave guide onto a near-field transducer, the near-field transducer comprising:
      an enlarged transducer portion of plasmonic material extending from an input end to an output end, at least one surface of the transducer portion including a trench disposed between two raised portions of the plasmonic material, the trench extending at least partially from the input end to the output end; and
      a peg of the plasmonic material disposed on and extending from the output end of the transducer portion;
    exciting the near field transducer responsive to the light; and
    generating from the trench gap-plasmon surface waves that enhance plasmonic coupling efficiency between the near field transducer and a magnetic media disposed proximate to the near field transducer.

18. The method of claim 17, wherein focusing the light comprises focusing the light using a solid immersion mirror (SIM).

19. The method of claim 17, wherein the peg is offset from the trench in a direction normal to the surface of the transducer portion.

* * * * *